J. DRUMMOND.
Mowing Machine.
9808X
Patented June 30, 1836.
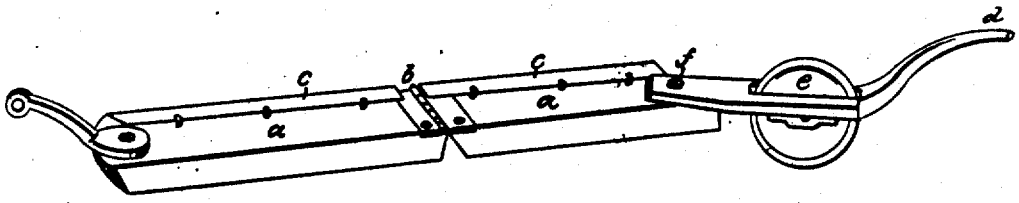
N. PETERS, Photo-Lithographer, Washington, D. C.

9808X

UNITED STATES PATENT OFFICE.

JOHN DRUMMOND, OF WATERFORD, NEW YORK.

IMPROVEMENT IN MACHINES FOR MOWING GRASS, GRAIN, &c.

Specification forming part of Letters Patent dated June 30, 1836.

*To all whom it may concern:*

Be it known that I, JOHN DRUMMOND, of Waterford, in the county of Saratoga and State of New York, have invented an improvement in the useful arts, being a Machine for Mowing Grass, Grain, &c., which is described as follows, reference being had to the annexed drawing of the same, making part of this specification.

This machine consists of rectangular flat pieces of wood or iron, *a*, united together at their joints *b*, which I term a "shoe," on the upper side of which shoe, at the edge, are fastened knives or cutters *c*, for cutting the grass, &c.

To one end of the shoe are attached proper fixtures for the horse to draw by, and which may consist of swivels, thills, wheels, or other suitable contrivances. At the other or hind end of the shoe is attached a lever, *d*, and wheel *e*, for guiding the shoe, one end of the lever being attached to the shoe by a joint, *f*. The other end is laid hold of by the operator.

In mowing with this machine the horse is driven forward. The mower lays hold of the lever and causes the shoe to incline from *e*—the line in which the animal draws—about ten, twenty, thirty, forty, or any convenient number of degrees, and less than ninety, which, as the machine moves forward, will cut the grass, the joints allowing the shoe to conform to the inequalities of the ground.

The shoe may be made in a triangular form in joints having knives on two of its sides, the propelling power being attached to the apex of the triangular shoe or mowing-machine.

What I claim as my invention, and desire to secure by Letters Patent, consists in—

The before-described machine for mowing grass, grain, &c., whether constructed in the exact form and proportions here laid down or in any other containing the same principles.

JOHN DRUMMOND.

Witnesses:
WM. P. ELLIOTT,
DIMON B. BARNUM.